(No Model.)
E. WEHRLI.
PENCIL HOLDER.
No. 439,220. Patented Oct. 28, 1890.
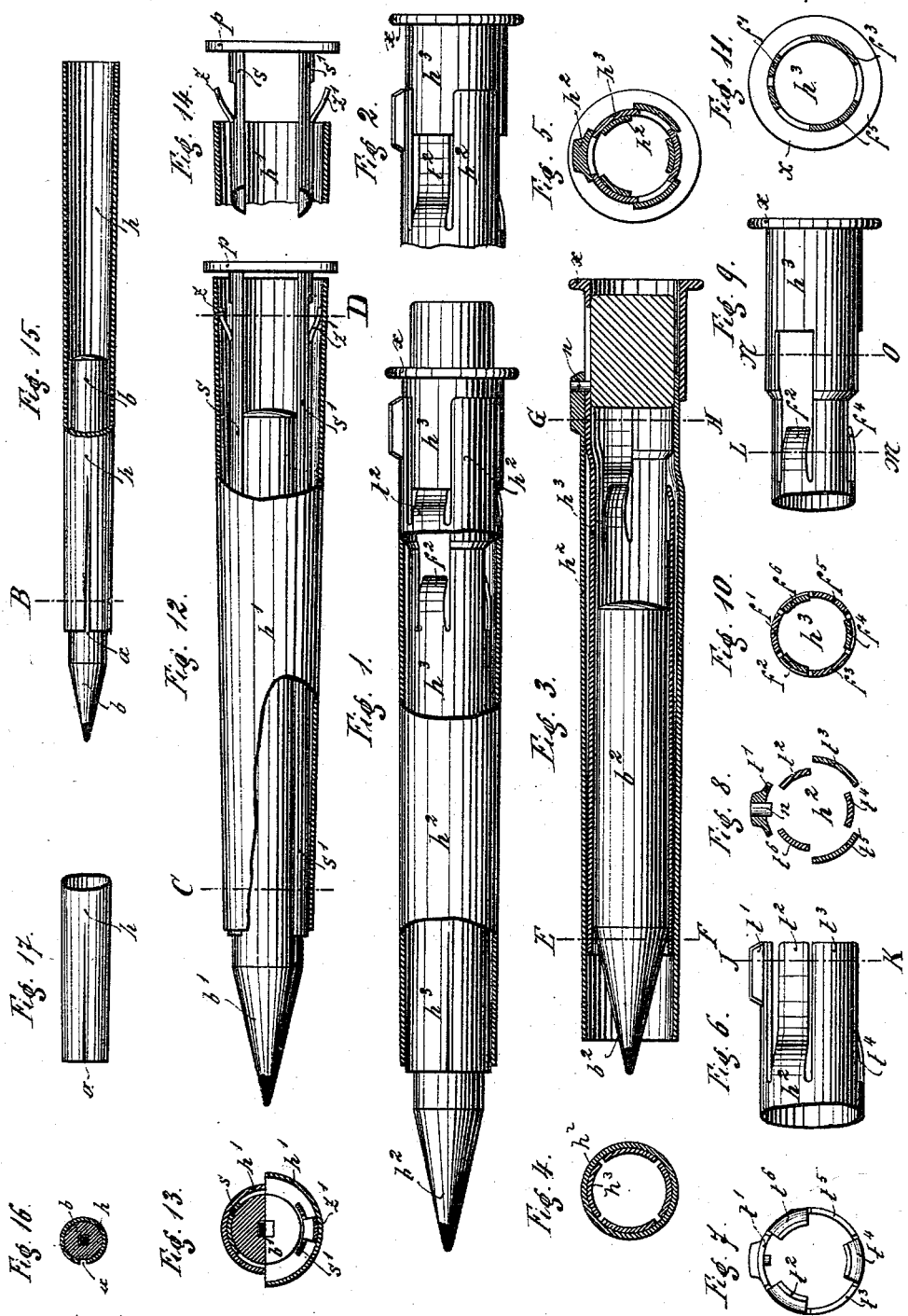
Witnesses:
Howard L. White
Hdebos
Inventor.
Emil Wehrli
By Richards & ⸺ Attorneys

UNITED STATES PATENT OFFICE.

EMIL WEHRLI, OF AARAU, SWITZERLAND.

PENCIL-HOLDER.

SPECIFICATION forming part of Letters Patent No. 439,220, dated October 28, 1890.

Application filed August 1, 1889. Serial No. 319,437. (No model.)

*To all whom it may concern:*

Be it known that I, EMIL WEHRLI, a citizen of the Swiss Republic, residing at Aarau, Switzerland, have invented new and useful Improvements in Pencil-Holders; and I do hereby declare that the following is a full, clear, and exact description of the same.

The pencil-holder forming the subject of the present invention has for its object the utilization of short lengths of pencil, such as would otherwise ordinarily be wasted. The pencil-holder is constructed to form a continuation of the pencil.

It is advantageous to have a pencil-holder such as, besides being durable, shall also be simple and can be used with rapidity, and these advantages are believed to be attained in the improved pencil-holder, of which several modifications are hereinafter described, by the employment of suitably-arranged conical sheaths or tubes.

In the accompanying sheet of illustrative drawings, Figure 1 shows in elevation one form of pencil-holder which is provided with a piece of india-rubber for erasing purposes in its rear end. A pencil is shown inserted and held in position for use, and the outer sheath or tube is shown partially broken away. Fig. 2 shows the rear portion of the pencil-holder with the inner sheath or tube drawn back, so that the india-rubber is covered over and the pencil is loose in the sheath or tube. Fig. 3 is a longitudinal section through the pencil-holder with the inner sheath or tube drawn back, as in Fig. 2. Fig. 4 is a section on the line E F, and Fig. 5 a section on the line G H, of Fig. 3. Fig. 6 is an elevation of the rear portion of the outer conical sheath or tube, the front portion being broken away. Fig. 7 is a rear elevation of the same. Fig. 8 is a section on the line J K of Fig. 6. Fig. 9 is an elevation of the rear portion of the inner sheath or tube, the front portion being similarly broken away.
Fig. 10 is a section on the line L M, and Fig. 11 a section on the line N O, of Fig. 9. Fig. 12 shows, partly in elevation and partly in section, a modification of the pencil-holder, in which the inner clamping sheath or tube is replaced by nipping or clamping tongues, the pencil-holder being shown provided with a pencil ready for use. Fig. 13 is a section on the line C D of Fig. 12. Fig. 14 shows in section the rear portion of the pencil-holder, the pencil being assumed to be lying loose in the inner sheath or tube, which is shown drawn back. Fig. 15 represents, partly in elevation and partly in section, a modification of the pencil-holder in its simplest form, and comprising an elastic conical sheath or tube, with the pencil therein shown clamped ready for use. Fig. 16 is a section on the line B, Fig. 15. Fig. 17 illustrates the pencil-holder without pencil, the rear end being shown broken off.

The pencil-holder, Figs. 1 to 11, consists, essentially, of an outer conical sheath or tube, which serves to effect the clamping of the short pieces of pencil which have been pushed into and are situated within the same. Between this outer sheath or tube and the pencil is an inner sheath or tube, that is slotted at its forward end, so as to form tongues that are pressed together by the backward movement of the conical (but not slotted) front portion of the outer sheath or tube relatively to the inner one. This operation serves to secure the pencil in position by clamping. The double sheath or tube arrangement enables the rear end of the pencil-holder to receive a piece of india-rubber, (for erasing purposes.) This is effected by means of a kind of slot arrangement which allows metal tongues to move over and relatively to one another in such a manner that the piece of india-rubber is firmly held and is protected from injury when the pencil is not in use—as, for example, when it is carried in the pocket.

I will now proceed to describe the invention more fully by reference to the drawings.

The outer sheath $h^2$, Fig. 6, is formed at its rear or wide end with a number of slots (in the present example six slots are shown) in such a manner that the sheath or tube is thereby divided at its periphery into a number (six in the present case) of approximately equal portions or tongues $t'$, $t^2$, $t^3$, $t^4$, $t^5$, and $t^6$, certain of which are bent inwardly in such a manner that an annular space is formed that extends between the outer tongues $t'$ $t^3$ $t^5$ and the inner ones $t^2$ $t^4$ $t^6$ for the reception of the inner sheath or tube, Fig. 5, as will be hereinafter more fully explained.

The inner sheath or tube $h^3$, Fig. 9, has, corresponding to the above slots, six similar slots of approximately the same length as those in the sheath or tube $h^2$, but with difference that the former slots only begin at a certain distance from the upper or rear wide end of the inner sheath or tube. These slots divide the sheath or tube $h^3$ at its periphery into six parts $f'$, $f^2$, $f^3$, $f^4$, $f^5$, and $f^6$, the alternate ones $f^2 f^4 f^6$ of which parts (corresponding to the tongues $t^2$, $t^4$, and $t^6$) are removed toward the rear end, the remaining portions forming tongues that are slightly bent inwardly, as shown in Figs. 9 and 10. The front thin end of the sheath or tube $h^3$ is also provided with a number of slots, Fig. 4, whereby elastic tongues are formed which can be clamped (tightened) by the front end of the sheath or tube $h^2$. The rear end of the sheath or tube $h^3$ is provided with a rim $x$.

The sheath or tube $h^3$ is introduced into the sheath or tube $h^2$ in such a manner that the downwardly-bent parts $t^2 t^4 t^6$ of the sheath or tube $h^2$ enter in the corresponding openings behind the tongues $f^2 f^4 f^6$. (See Figs. 3 and 5.) The movement of the two sheaths or tubes within each other is limited by a pin $n$, which is formed on or carried by the sheath or tube $h^2$, and moves in a slot in the sheath or tube $h^3$. (Shown in Fig. 3 without shading for the sake of clearness.)

To secure the piece of pencil $b^2$ in the holder just described, its two sheaths or tubes are brought into their pulled-out positions. (Shown in Fig. 2 or 3.) The pin $n$ then bears against the front end of the slot in $h^3$. The pencil can now be introduced in front into the concentric sheaths or tubes $h^2$ and $h^3$, Fig. 3. The pencil is brought into a position ready for use by moving the sheath or tube $h^3$ forward within the sheath or tube $h^2$ and into the position shown in Fig. 1. The pencil will then be firmly connected with the holder by elastic clamping, the tube $h^2$ being somewhat contracted at its front end. The arrangement for holding the pencil is situated in front, as described, while at the rear end there is provided a device for holding a piece of india-rubber, (for erasing purposes,) this device consisting mainly of the tongues $t^2$, $t^4$, and $t^6$ of the sheath or tube $h^2$. These tongues clamp the india-rubber in all positions of the sheaths or tubes relatively to each other. The length of the india-rubber is made such that when the sheaths or tubes are pushed together—that is to say, when the holder is in a position for use—the india-rubber is exposed and is also ready for use, as shown in Fig. 1.

By drawing back provisionally the inner sheath or tube $h^3$ a certain distance by means of the rim $x$ the pencil will be released and can be moved rearwardly between the tongues $f^2$, $f^4$, and $f^6$.

On drawing the inner sheath or tube back farther the rear end of the pencil is secured in its rearward position, owing to the curved or bent portions of the tongues $t^2$, $t^4$, and $t^6$ then exerting a certain pressure upon the tongues $f^2 f^4 f^6$, and consequently upon the pencil. The india-rubber is at the same time secured by the free or end portions of the tongues $t^2$, $t^4$, and $t^6$, and is covered over by the widest or rear part of the inner sheath or tube $h^3$.

When the device for holding the india-rubber is not required, the construction of the rear end of the holder, based upon the pushing in of the tongues $t^2$, $t^4$, and $t^6$ and the tongues $f^2$, $f^4$, and $f^6$, may be dispensed with, and the inner elastic sheath or tube $h^3$ may be replaced by a tongue-piece or clamp-piece $p\ s\ s'$. This modification is illustrated in Figs. 12 to 14. Between the outer sheath or tube $h'$ of this modification and the pencil $b'$ are situated the clamping-tongues $s$ and $s'$, which are fixed to the cap or cover $p$, and are preferably (for the purpose of centering) provided with partially-stamped-out elastic pieces $z$ and $z'$. The pushing forward or the drawing back of the clamping-piece $p\ s\ s'$ effects the clamping or releasing, respectively, of the pencil. The pencil can while in its released position be moved as required. Instead of introducing the pencil from the front end it may be introduced from the rear if an aperture is provided for that purpose in the cap or cover $p$.

The pencil-holder may be prevented from rolling about when laid down by making the rim of the cap or cover $p$ four-sided.

A modification that is still more simple in construction than that shown in Figs. 12 to 14 (employment of substitute for inner sheath) consists in the very simplest modification of the inner conical sheath or tube $h^3$, the outer conical sheath being dispensed with. The conical sheath or tube $h^3$, with its tongues, &c., is reduced to a simple conical sheath or tube with slotted front portion, as shown in Figs. 15 to 17. The slot or slots $a$ must be such that the pencil can be moved within the slotted portion of the sheath or tube by hand without much exertion, while this portion of the sheath or tube must afford sufficient pressure to hold the pencil while writing. The pencil can be moved forward within the sheath or tube by means of any suitable thin pin or rod applied to its rear end.

Having fully described my invention, what I claim as new, and desire to secure by Letters Patent, is—

1. A pencil-holder provided with a device for holding a piece of india-rubber, consisting, essentially, in an outer and an inner tube or sheath $h^2$ and $h^3$, effecting by their relative sliding the clamping or the release of the pencil and being provided at their rear end with tongues, so that the alternate tongues of the outer tube or sheath $h^2$ enter by the way of slots over the corresponding tongues of the inner tube or sheath $h^3$ into this inner tube and there constantly hold the rubber both in the position for use and when the rubber is covered over by the widest or rear part of the inner tube or sheath $h^3$, substantially as hereinbefore shown and described.

2. In a pencil-holder, the arrangement for holding the india-rubber by means of the tongues $t^2$ $t^4$ $t^6$ of the tube or sheath $h^2$ entering into the slots of the tube of sheath $h^3$ over the corresponding tongues $f^2$ $f^4$ $f^6$ and securing in this manner the india-rubber within the tube or sheath $h^3$ in all positions of the pencil-holder, substantially as hereinbefore shown and described.

3. In a pencil-holder, a conical tube or sheath with a sliding tongue or clamp-piece between the tube and the pencil, having elastic tongues at both its front and rear ends for the purpose of securing or releasing the pencil, substantially as hereinbefore shown and described.

4. In a pencil-holder, a conical tube or sheath holding the inserted pencil by means of an elastic clamping device operating at the front end and in the direction of the periphery of the tube, as set forth.

5. In a pencil-holder, an inner tube having elastic tongues at both its forward and rear ends, and an outer tube surrounding the inner tube and engaging it to operate said tongues to hold the pencil in either a protruded or a retracted position, substantially as set forth.

In testimony whereof I hereunto sign my name, in the presence of two subscribing witnesses, this 10th day of July, 1889.

E. WEHRLI.

Witnesses:
EMIL BLUM,
*Patent Agent, Zurich.*
H. LABHART.